United States Patent [19]

Liede et al.

[11] 3,895,012

[45] July 15, 1975

[54] 2-ALKYL-4(3H)-PTERIDINONE COMPOUNDS AND THERAPEUTIC COMPOSITIONS

[75] Inventors: Volker Liede, Mannheim; Alfred Popelak, Rimbach; Max Thiel, Mannheim; Klaus Hardebeck, Ludwigshafen; Egon Roesch, Lampertheim, all of Germany

[73] Assignee: Boehringer Mannheim GmbH, Mannheim-Waldhof, Germany

[22] Filed: June 18, 1973

[21] Appl. No.: 371,210

[30] Foreign Application Priority Data
June 30, 1972 Germany............................ 2232098

[52] U.S. Cl.... 260/251.5; 260/250 R; 260/256.4 C; 424/251
[51] Int. Cl............................................ C07d 57/28
[58] Field of Search................................ 260/251.5

[56] References Cited
OTHER PUBLICATIONS
Albert et al., C.A. 57, 4658–4659, (1962).

Primary Examiner—Donald G. Daus
Assistant Examiner—Raymond V. Rush
Attorney, Agent, or Firm—Burgess, Dinklage & Sprung

[57] ABSTRACT

2-Alkyl-4(3H)-pteridinone compounds of the formula

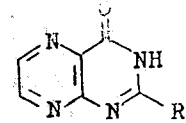

wherein
R is a straight-chain, branched or cyclic alkyl radical containing two to seven carbon atoms;

and the salts thereof with physiologically compatible acids and bases; are outstandingly effective in diuretic and natriuretic action.

9 Claims, No Drawings

2-ALKYL-4-(3H)-PTERIDINONE COMPOUNDS AND THERAPEUTIC COMPOSITIONS

The present invention relates to new 2-alkyl-4(3H)-pteridinone compounds and to therapeutic compositions containing them.

The new 2-alkyl-4-(3H)-pteridinones according to the present invention are compounds of the formula:

wherein
R is a straight-chain, branched or cyclic alkyl radical containing two to seven carbon atoms;
and the salts thereof with physiologically compatible acids and bases.

We have found that the new compounds of formula (I) are characterized by an excellent diuretic and natriuretic action.

The new compounds according to the present invention can be prepared, for example, by one of the following methods:

a. reaction of a compound of the formula:

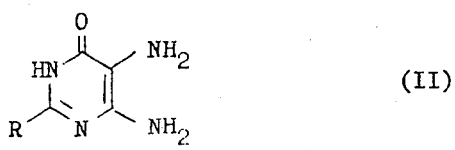

wherein R has the same meaning as above, with glyoxal or with a reactive derivative thereof; or b. condensation of a compound of the formula:

wherein
X is a carboxylic acid group or a reactive derivative thereof and
Y is an amino group or a residue which can be exchanged for an amino group,
with a carboxylic acid of the formula

wherein R has the same meaning as above, or with a reactive derivative thereof; whereafter, if desired, the compound obtained is converted into a pharmacologically compatible salt.

Process (a) is carried out in known manner by condensing 4,5-diaminopyrimidines of formula (II) or acid-addition salts thereof with glyoxal or the reactive derivatives thereof; for this purpose, there can be used, for example, sodium bisulfite addition compounds, acetals, oximes, hydrazones and the like. The reaction can be carried out in water, an alcohol or other appropriate inert solvent at ambient temperature or at an elevated temperature; the reaction can be carried out in the absence or presence of acidic or alkaline condensation agents, for example mineral acids, alkali metal hydroxides, alkali metal alcoholates or ion exchangers.

For carrying out process (b), compounds of formula (III) are preferably heated in an excess of the carboxylic acid of formula (IV) or of a reactive derivative thereof in the presence of an appropriate condensation agent. If desired, an inert solvent can be added. As reactive derivatives of the carboxylic acids of formula (III), the amides are especially preferred. As residue Y which can be exchanged for an amino group, there can be used, for example, a halogen atom. The preferred reactive derivatives of the compounds of formula (IV) are compounds of the formula:

wherein R has the same meaning as above and $Z_1$, $Z_2$ and $Z_3$, which may be the same or different, are alkoxy or acyloxy groups or two of them together can represent an imino group. It is especially preferred to use a mixture of orthocarboxylic acid esters or carboximic acid esters of formula (V) and a condensation agent.

As examples of condensation agents which can be used, there may be mentioned carboxylic acid anhydrides, acetic anhydride being especially preferred. However, other condensation agents can also be used, for example, mineral acids, such as sulfuric acid or polyphosphoric acid, or Lewis acids or Lewis bases or appropriate ion exchangers.

For conversion into a salt, a compound of formula (I) is mixed, for example in aqueous solution, with the calculated amount of a physiologically compatible acid or base and preferably evaporated in a vacuum to dryness.

The following Examples are given for the purpose of illustrating the present invention:

EXAMPLE 1

Preparation of 2-Ethyl-4(3H)-pteridinone 10 g (65 mM) 2-ethyl-4,5-diamino-6-hydroxypyrimidine were heated to the boil in 100 ml water, 5.7 g (75 mM) glyoxal hydrate were added thereto and the reaction mixture was further boiled for 15 minutes. The reaction mixture was then evaporated to dryness in a vacuum and the residue was mixed with a little ethanol. There were obtained 3.8 g 2-ethyl-4(3H)-pteridinone which, after recrystallization from ethanol, melts, with decomposition, at 245°–255°C.

The 2-ethyl-4,5-diamino-6-hydroxy-pyrimidine used as starting material was prepared in a manner analogous to that described in J. Chem. Soc., 1953, 3721, for the preparation of 2-methyl-4,5-diamino-6-hydroxypyrimidine. The yield was 61% of theory and the compound melts, with decomposition, at 227°–230°C.

EXAMPLE 2

Preparation of 2-Isopropyl-4(3H)-pteridinone

In a manner analogous to that described in Example 1, from 10 g 2-isopropyl-4,5-diamino-6-hydroxy-pyrimidine, there were obtained 3 g 2-isopropyl-4(3H)-pteridinone which, after recrystallization from ethanol, melts at 232°–234°C.

The 2-isopropyl-4,5-diamino-6-hydroxy-pyrimidine used as starting material was prepared in a manner analogous to that described in *J. Chem. Soc.*, 1953, 3721, for 2-methyl-4,5-diamino-6-hydroxypyrimidine. The yield was 58% of theory and the compound melts, with decomposition, at 220°–230°C.

EXAMPLE 3

Preparation of 2-Propyl-4(3H)-pteridinone

Method I:

A mixture of 20 ml butyrimic acid ethyl ester and 20 ml acetic anhydride was mixed with 5 g (36 mMol) 3-amino-pyrazine-carboxamide and the reaction mixture was heated under reflux for an hour. The dark solution was then evaporated and the oily residue was boiled with ethyl acetate. Upon cooling, 2-propyl-4(3H)-pteridinone crystallized out and was isolated. The yield was 4.8 g. After recrystallization from water, the compound melts at 203°–205°C.

Method II:

A mixture of 10 ml orthobutyric acid triethyl ester and 10 ml acetic anhydride was mixed with 2 g 3-amino-pyrazine-carboxamide and heated under reflux for an hour. The 2-propyl-4(3H)-pteridinone which crystallized out upon cooling was filtered off and recrystallized from ethanol. The yield was 1 gram and the product has a melting point of 204°–205°C.

EXAMPLE 4

Preparation of 2-Isobutyl-4(3H)-pteridinone

A mixture of 32 g (25 mol) isovalerimic acid ethyl ester and 20 g (0.2 mol) acetic anhydride was heated to about 200°C so that a part of the readily volatile components could distill off and the boiling point increased to above 150°C. There were then added 5 g (36mMol) 3-aminopyrazine-carboxamide and the reaction mixture was heated for 3 hours to about 200°C, thereafter distilled off as far as possible and the residue brought to crystallization by the addition of ethanol and ether. There were obtained 3.5 g 2-isobutyl-4(3H)-pteridinone which, after recrystallization from ethanol, melts at 236°–238°C.

The following compounds were prepared in an analogous manner:

2-cyclopropyl-4(3H)-pteridinone from 3-aminopyrazine-carboxamide and cyclopropane-carbimido ethyl ester; yield 84% of theory; m.p. 275°C (decomp.), after recrystallization from water;

2-cyclohexyl-4(3H)-pteridinone from 3 aminopyrazine-carboxamide and cyclohexane-carbimido ethyl ester; yield 52% of theory; m.p. 232°–234°C, after recrystallization from ethanol;

2-(3-pentyl)-4(3H)-pteridinone from 3-aminopyrazine-carboxamide and diethylacetimido ethyl ester; yield 45% of theory; m.p. 112°C, after recrystallization from ethyl acetate;

2-tert.-butyl-4(3H)-pteridinone from 3-aminopyrazine-carboxamide and trimethylacetimido ethyl ester; yield 45% of theory; m.p. 264°–266°C, after recrystallization from ethyl acetate;

2-cyclopentyl-4(3H)-pteridinone from 3-aminopyrazine-carboxamide and cyclopentane-carbimido ethyl ester; yield 48% of theory; m.p. 257°C (decomp.), after recrystallization from ethyl acetate.

EXAMPLE 5

Preparation of 2-Neopentyl-4(3H)-pteridinone 3.9 g (20 mMol) 2-neopentyl-4,5-diamino-6-hydroxypyrimidine and 1.9 g (25 mol) glyoxal hydrate were heated in 30 ml ethanol, after the addition of 0.4 ml concentrated hydrochloric acid, for 15 minutes under reflux. The reaction solution was then evaporated to dryness in a vacuum and the residue extracted under reflux with ethyl acetate. The ethyl acetate extract was evaporated to dryness in a vacuum and the residue (2.2 g) recrystallized from ethyl acetate. There was obtained, in a yield of 52% of theory, 2-neopentyl-4(3H)-pteridinone, which has a melting point of 252°–254°C.

The 2-neopentyl-4,5-diamino-6-hydroxypyrimidine used as starting material was prepared in a manner analogous to that described in J. Chem. Soc., 1953, 3721 for 2-methyl-4,5-diamino-6-hydroxy-pyrimidine. It melts, with decomposition, at 170°C.

In order to demonstrate the diuretic and natriuretic activity of the instant compounds, the following tests were carried out using compounds representative of the invention.

The following were the test compounds:

| | |
|---|---|
| Compound A (Comparison Compound) | 2-methyl-4(3H)-pteridinone (J. Chem. Soc. 1962, pp. 1591–1596) |
| Compound 1 | 2-ethyl-4(3H)-pteridinone |
| Compound 2 | 2-isopropyl-4(3H)-pteridinone |
| Compound 3 | 2-propyl-4(3H)-pteridinone |
| Compound 4 | 2-isobutyl-4(3H)-pteridinone |
| Compound 5 | 2-cyclopropyl-4(3H)-pteridinone |
| Compound 6 | 2-cyclohexyl-4(3H)-pteridinone |
| Compound 7 | 2-tert.-butyl-4(3H)-pteridinone |
| Compound 8 | 2-cyclopentyl-4(3H)-pteridinone |

The following tests were employed:

A. Experiments on Rats

Female Sprague Dawley rats, having an average weight of 180 grams, were maintained in a fasting condition overnight but were allowed an unlimited amount of drinking water. These rats were maintained for at least one week prior to the experiments in climatized rooms held at 23° ± 5%. During the experiments the animals were placed into metabolic cages, 5 rats per cage. The test compound was administered orally and intraperitoneally in a 1.0% methyl cellulose solution (10 ml/kg.) After 2 hours had elapsed, and again after 6 hours had elasped, the animals' bladders were pressed out and the volume of urine measured and the chloride content of the urine determined titrametrically and flame photometrically with Na+ and K+. The results of this series of experiments are set forth in Table I below.

TABLE I

EFFECTIVENESS OF COMPOUND A AND COMPOUNDS 1 TO 8 WITH RESPECT TO INFLUENCING URINE AND SODIUM EXCRETION IN RATS BY INTRAPERITONEAL ADMINISTRATION

| Substance [Prep. Ex. No.] | Dosage (mg/kg) | 0 – 2 Hours | | | | | 0 – 6 Hours | | | | |
|---|---|---|---|---|---|---|---|---|---|---|---|
| | | ml/kg urine | Cl* | Na* | K* | Na/K | ml urine | Cl* | Na* | K* | Na/K |
| 2-Methyl-4-(3H)-pteridinone (Comparison) | 25 | 4.3 | 0.12 | 0.13 | 0.13 | 1.0 | 14.0 | 0.81 | 0.67 | 0.67 | 1.0 |
| | 50 | 3.3 | 0.11 | 0.12 | 0.16 | 0.8 | 12.6 | 0.73 | 0.66 | 0.94 | 0.7 |
| 2-Ethyl-4(3H)-pteridinone [1] | 50 | 5.3 | 0.48 | 0.49 | 0.12 | 4.2 | 25.5 | 2.2 | 2.3 | 0.83 | 2.7 |
| 2-Isopropyl-4(3H)-pteridinone [2] | 25 | 11.1 | 1.3 | 1.5 | 0.12 | 13.1 | 25.8 | 2.9 | 3.0 | 0.66 | 4.5 |
| 2-Propyl-4(3H)-pteridinone [3] | 50 | 11.1 | 1.0 | 1.1 | 0.12 | 9.6 | 31.2 | 2.5 | 2.4 | 0.76 | 3.2 |
| 2-Isobutyl-4(3H)-pteridinone [4] | 50 | 14.4 | 1.4 | 1.6 | 0.15 | 10.7 | 33.8 | 3.3 | 3.5 | 0.55 | 6.3 |
| 2-Cyclopropyl-4(3H)-pteridinone [4] | 25 | 7.7 | 0.58 | 0.47 | 0.16 | 2.9 | 31.1 | 2.9 | 2.3 | 1.1 | 2.1 |
| 2-Cyclohexyl-4(3H)-pteridinone [4] | 25 | 11.7 | 1.4 | 1.3 | 0.14 | 9.9 | 30.5 | 3.4 | 3.1 | 0.60 | 5.3 |
| 2-Tert.butyl-4(3H)-pteridinone [4] | 25 | 18.4 | 2.1 | 2.3 | 0.16 | 14.7 | 32.5 | 3.8 | 4.2 | 0.39 | 10.6 |
| 2-Cyclopentyl-4(3H)-pteridinone [4] | 25 | 21.0 | 2.7 | 3.0 | 0.15 | 20.3 | 32.7 | 4.3 | 3.8 | 0.28 | 17.3 |

*milliequivalent

For use as medicaments with diuretic and natriuretic action, the new compounds according to the present invention can, in principle, be employed in all the conventional enteral and parenteral forms of administration. For this purpose, the active material is mixed with a solid or liquid pharmaceutical carrier or diluent and then brought into a suitable form.

Examples of solid carrier materials which can be used include lactose, mannitol, starch, talc, methyl cellulose and gelatine, to which, if desired, can be added coloring materials and/or flavoring materials. Because of the low solubility of the new compounds according to the present invention, for injectable solutions it is only possible to use very few solvent, for example dimethyl sulfoxide. Comparatively high concentrations of the compounds are, therefore, preferably administered in the form of suspension.

In human medicine, in the case of enteral administration, doses of active material of between 10 and 500 mg per day in one to four separate doses have proved to be useful and, in the case of intravenous administration, the most preferable amount of active material is between 5 and 100 mg per day.

The new compounds (I) according to the present invention, which are characterized by a good and surprisingly longlasting diuretic action, bring about, in the organism, a considerably increased excretion of sodium ions, without influencing the excretion of potassium ions. Thus, the new compounds according to the present invention differ from the previously known diuretics which either bring about an increased excretion of sodium and potassium ions or an excretion of sodium ions with simultaneous retention of potassium ions. Consequently, the physician is provided with a new agent for the treatment of patients with a disturbed sodium metabolism but with a normal potassium metabolism.

It will be understood that the specification and examples are illustrative but not limitative of the present invention and that other embodiments within the spirit and scope of the invention will suggest themselves to those skilled in the art.

What is claimed is:

1. 2-Alkyl-4(3H)-pteridinone compound of the formula

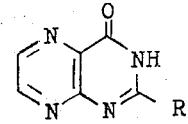

wherein

R is straight-chain, branched or cyclic alkyl of from two to seven carbon atoms;

and the pharmacologically acceptable salts thereof.

2. Compound as claimed in claim 1, wherein R is straight-chain alkyl.

3. Compound as claimed in claim 1, wherein R is branched-chain alkyl.

4. Compound as claimed in claim 1, wherein R is cyclic alkyl of from five to six carbon atoms.

5. Compound as claimed in claim 1, designated 2-isopropyl-4(3H)-pteridinone.

6. Compound as claimed in claim 1, designated 2-isobutyl-4(3H)-pteridinone.

7. Compound as claimed in claim 1, designated 2-cyclohexyl-4(3H)-pteridinone.

8. Compound as claimed in claim 1, designated 2-tert.-butyl-4(3H)-pteridinone.

9. Compound as claimed in claim 1, designated 2-cyclopentyl-4(3H)-pteridinone.

* * * * *